(12) United States Patent
Tanaka et al.

(10) Patent No.: US 11,522,202 B2
(45) Date of Patent: Dec. 6, 2022

(54) ALLOY MEMBER, CELL STACK, AND CELL STACK DEVICE

(71) Applicant: NGK INSULATORS, LTD., Nagoya (JP)

(72) Inventors: Yuki Tanaka, Nagoya (JP); Toshiyuki Nakamura, Nagoya (JP); Makoto Ohmori, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 390 days.

(21) Appl. No.: 16/728,289

(22) Filed: Dec. 27, 2019

(65) Prior Publication Data

US 2020/0152998 A1 May 14, 2020

Related U.S. Application Data

(63) Continuation of application No. PCT/JP2019/034559, filed on Sep. 3, 2019.

(30) Foreign Application Priority Data

Sep. 7, 2018 (JP) .............................. JP2018-168073
Jan. 23, 2019 (JP) .............................. JP2019-009259

(51) Int. Cl.
*H01M 8/0228* (2016.01)
*H01M 8/2484* (2016.01)
(Continued)

(52) U.S. Cl.
CPC ....... *H01M 8/0228* (2013.01); *H01M 8/0208* (2013.01); *H01M 8/0247* (2013.01); *H01M 8/2484* (2016.02)

(58) Field of Classification Search
None
See application file for complete search history.

(56) References Cited

U.S. PATENT DOCUMENTS

2011/0281194 A1 11/2011 Higashi et al.
2015/0155571 A1 6/2015 Higashi

FOREIGN PATENT DOCUMENTS

JP 5315476 B1 10/2013
JP 201535418 A 2/2015
(Continued)

OTHER PUBLICATIONS

PCT/JP2019/034559, Bypass Continuation Application.
(Continued)

*Primary Examiner* — Basia A Ridley
*Assistant Examiner* — Heng M. Chan
(74) *Attorney, Agent, or Firm* — Flynn Thiel, P.C.

(57) ABSTRACT

An alloy member includes a base member that includes a plurality of recesses in a surface and is constituted by an alloy material containing chromium, a plurality of embedded portions that are respectively disposed in the plurality of recesses, and a coating layer that covers the base member and is connected to the plurality of embedded portions. An average value of actual lengths of line segments of the plurality of embedded portions is longer than an average value of straight lengths of straight lines of the plurality of embedded portions in a cross-section of the base member along a thickness direction of the base member. The average value of the actual lengths is 1.10 times or more the average value of the lengths of the straight lines.

6 Claims, 11 Drawing Sheets

(51) Int. Cl.
*H01M 8/0208* (2016.01)
*H01M 8/0247* (2016.01)

(56) References Cited

FOREIGN PATENT DOCUMENTS

| JP | 6188181 B1 | 8/2017 |
|----|------------|--------|
| JP | 6343728 B1 | 6/2018 |
| WO | 2010087298 A1 | 8/2010 |
| WO | 2013172451 A1 | 11/2013 |

OTHER PUBLICATIONS

PCT/JP2019/034571, Bypass Continuation Application.
PCT/JP2019/034576, Bypass Continuation Application.
English language International Search Report for corresponding PCT/JP2019/034559, dated Nov. 19, 2019 (2 pages).
English Translation of the International Preliminary Report on Patentability, issued in corresponding International Application No. PCT/JP2019/034559, dated Mar. 18, 2021 (6 pages).
Japanese language International Search Report and Written Opinion for corresponding PCT/JP2019/034559, dated Nov. 19, 2019 (8 pages).
Notice of Reasons for Refusal for the corresponding Japanese Application No. 2019-009259 dated Mar. 12, 2019 with English Translation (10 pages).
Notice of Patent Opposition Petition for corresponding Japanese Application No. JP20190009259 (Patent No. 6559372), sent Dec., 2019, with partial English translation (81 pages).
Chun-Lin Chu et al., "Oxidation behavior of metallic interconnect coated with La-Sr-Mn film by screen painting and plasma sputtering", International Journal of Hydrogen Engergy, Netherlands, Elsevier B.V., Nov. 21, 2008, 34 (2009), p. 422-434 (13 pages).
U.S. Appl. No. 16/728,352, filed Dec. 27, 2019.
U.S. Appl. No. 16/728,631, filed Dec. 27, 2019.

ALLOY MEMBER, CELL STACK, AND CELL STACK DEVICE

CROSS-REFERENCE TO RELATED APPLICATIONS

This application is a continuation application of PCT/JP2019/034559, filed Sep. 3, 2019, which claims priority to Japanese Application No. 2018-168073, filed Sep. 7, 2018, and Japanese Application No. 2019-009259, filed Jan. 23, 2019, the entire contents all of which are incorporated hereby by reference.

TECHNICAL FIELD

The present invention relates to an alloy member, a cell stack, and a cell stack device.

BACKGROUND ART

A cell stack device provided with a cell stack in which a plurality of fuel cells, which are one type of electrochemical cell, are electrically connected to each other by current collector members, and a manifold for supporting the fuel cells is conventionally known (see Patent Literatures 1 and 2).

An alloy member is used in the current collector member and the manifold.

The manifold disclosed in JP 2015-035418A is provided with a coating layer covering the surface of a base member constituted by stainless steel in order to inhibit volatilization of Cr (chromium) from the base member.

The current collector member disclosed in WO 2013/172451 is provided with a coating layer covering the surface of a base member constituted by an Fe—Cr-based alloy, a Ni—Cr-based alloy, or the like in order to inhibit volatilization of Cr from the base member.

Also, in WO 2013/172451, it is possible to inhibit separation of the coating layer from the base member as a result of a portion of chromium oxide layer of the coating layer that is in contact with the base member entering recesses of the surface of the base member.

SUMMARY

However, with the current collector member disclosed in WO 2013/172451, the coating layer may separate from the base member during operation of the cell stack device.

An object of the present invention is to provide an alloy member, a cell stack, and a cell stack device capable of inhibiting separation of a coating layer.

An alloy member according to the present invention includes a base member that includes a plurality of recesses in a surface of the base member and that is constituted by an alloy material containing chromium, a plurality of embedded portions that are respectively disposed in the plurality of recesses and are constituted by a ceramic material, and a coating layer that covers at least a portion of the surface of the base member and is connected to the plurality of embedded portions. An average value of actual lengths of line segments of the plurality of embedded portions is longer than an average value of straight lengths of straight lines of the plurality of embedded portions in a cross-section of the base member along a thickness direction of the base member. The line segment connects midpoints in a surface direction of a part of the embedded portion that is embedded in the recess. The surface direction is perpendicular to the thickness direction. The straight line connects a start point and an endpoint of the line segment. The average value of the actual lengths is 1.10 times or more the average value of the lengths of the straight lines.

According to the present invention, it is possible to provide an alloy member, a cell stack, and a cell stack device capable of inhibiting separation of a coating layer.

DESCRIPTION OF EMBODIMENTS

An embodiment of a cell stack device according to this embodiment will be described with reference to the drawings.

Cell Stack Device 100

Figure 1:
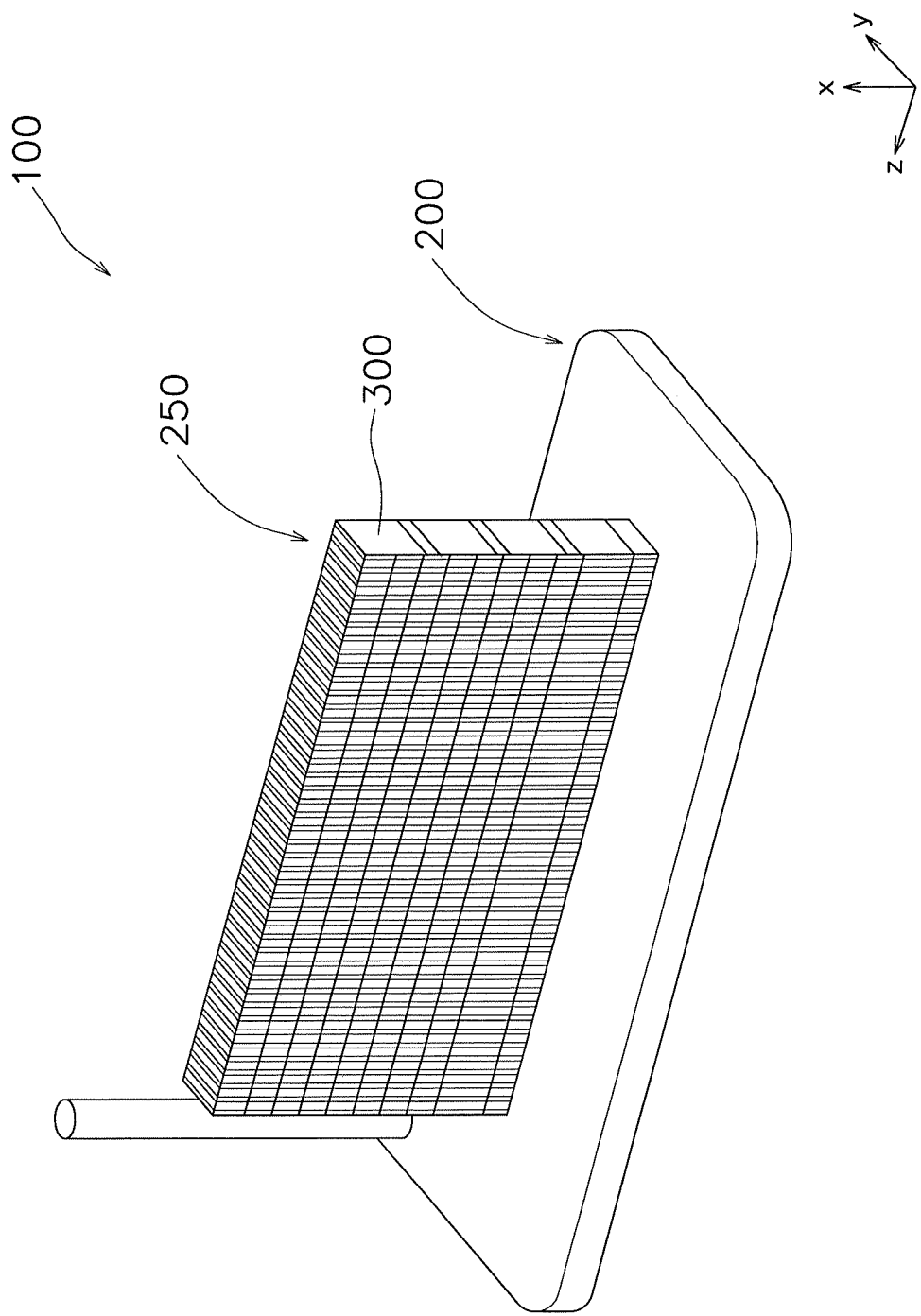
FIG. 1 is a perspective view of a cell stack device.

FIG. 1 is a perspective view of a cell stack device 100. The cell stack device 100 includes a manifold 200 and a cell stack 250.

Manifold 200

Figure 2:
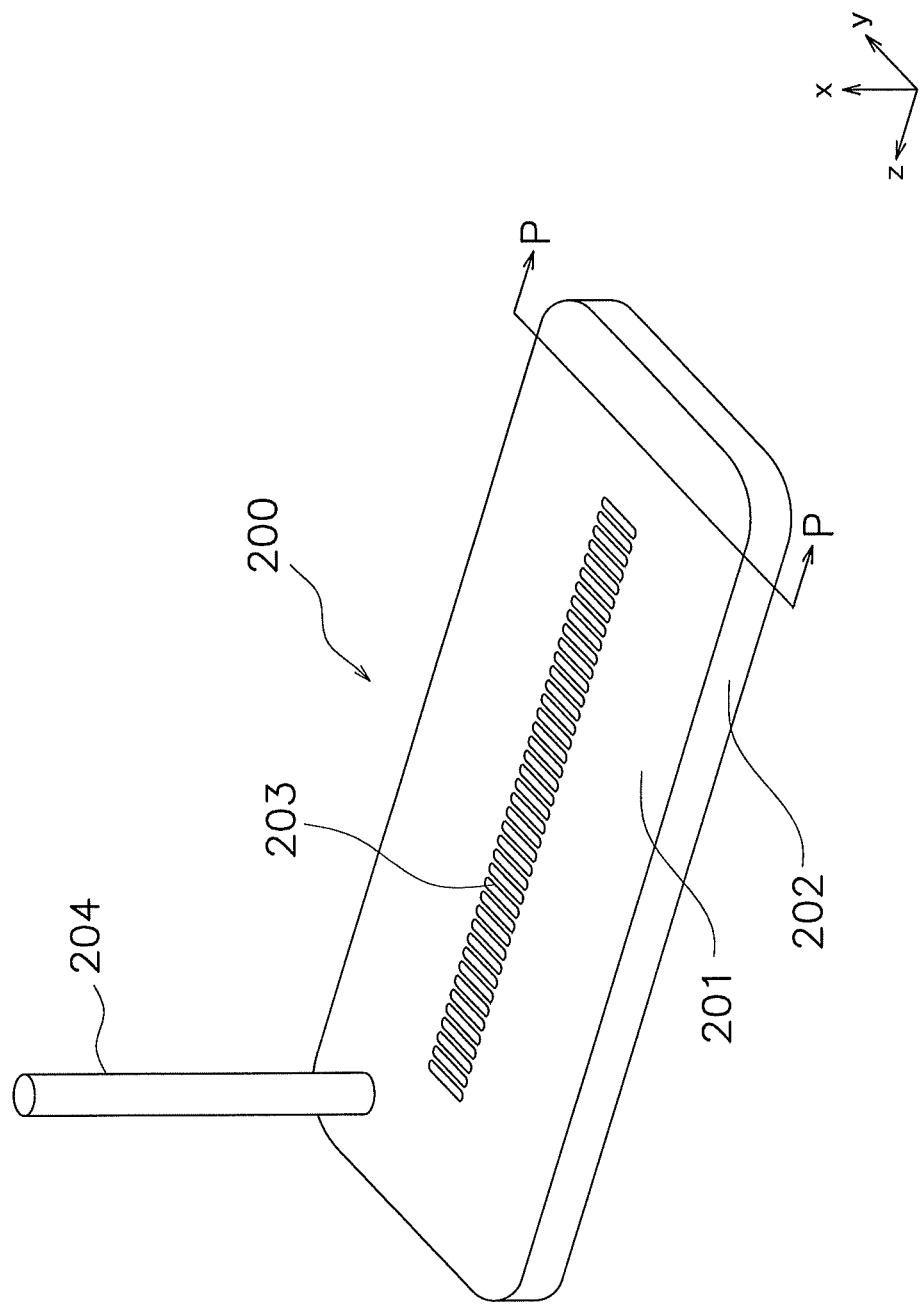
FIG. 2 is a perspective view of a manifold.

FIG. 2 is a perspective view of the manifold 200. The manifold 200 is an example of an "alloy member".

The manifold 200 is configured to distribute fuel gas (e.g., hydrogen) to fuel cells 300. The manifold 200 is hollow, and has an internal space. Fuel gas is supplied to the internal space of the manifold 200 via an introduction pipe 204.

The manifold 200 includes a top plate 201 and a container 202. The top plate 201 is formed into a flat plate shape. The container 202 is formed into a cup shape. The top plate 201 is disposed to cover an upper opening of the container 202.

Figure 6:
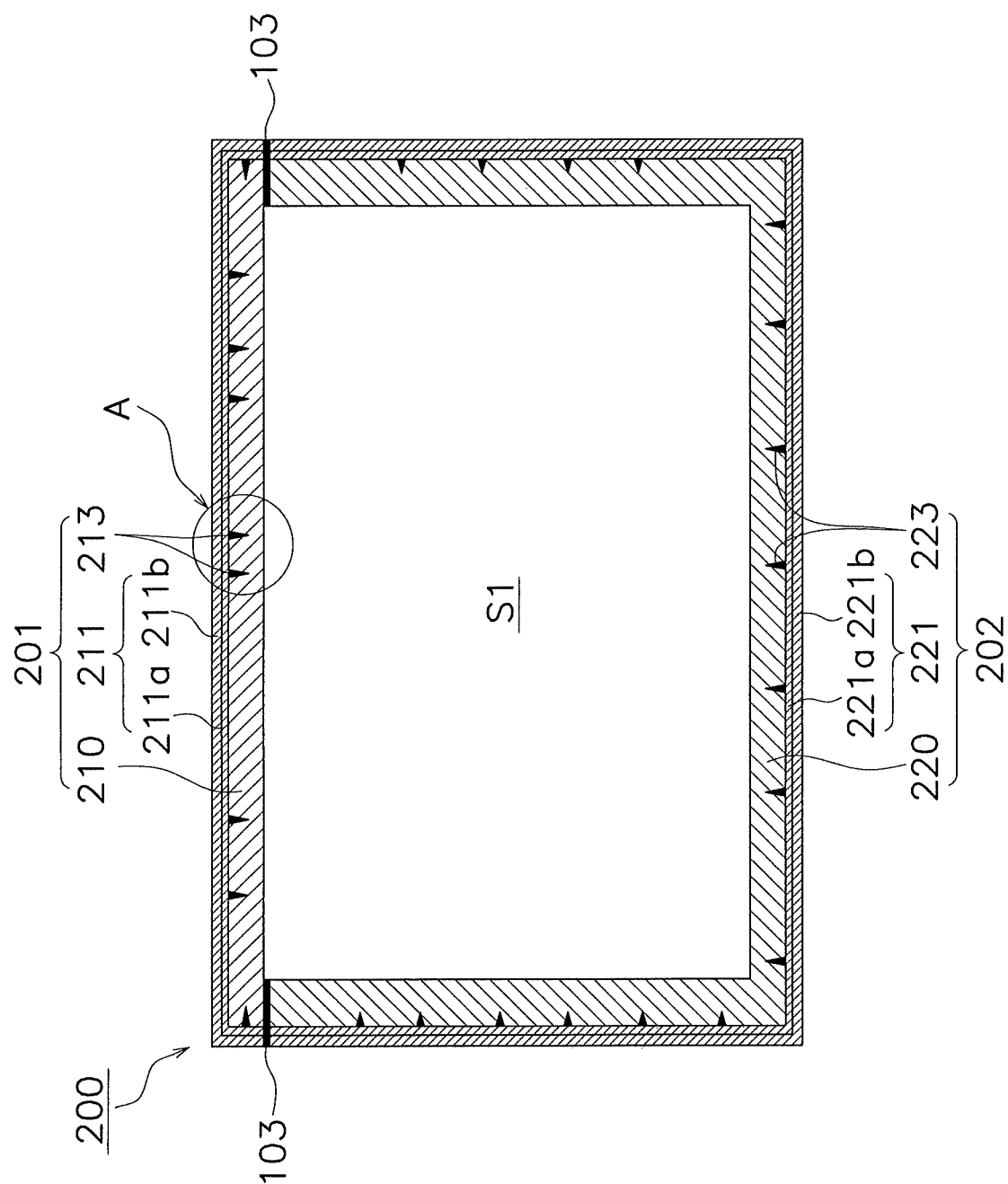
FIG. 6 is a cross-sectional view taken along P-P shown in FIG. 2.

The top plate 201 is bonded to the container 202 by a bonding material 103 (not shown in FIG. 2, see FIG. 6). Examples of the bonding material 103 include crystallized glass, amorphous glass, brazing materials, and ceramic materials. In this embodiment, crystallized glass refers to glass in which the ratio of "the volume of a crystal phase" to the total volume (the degree of crystallinity) is 60% or more, and the ratio of "the volume of an amorphous phase and impurities" to the total volume is less than 40%. Examples of such crystallized glass include $SiO_2$—$B_2O_3$-based, $SiO_2$—CaO-based, and $SiO_2$—MgO-based glass.

The top plate 201 is provided with a plurality of insertion holes 203. The insertion holes 203 are arranged in the direction in which the fuel cells 300 are arranged (the Z-axis direction). The insertion holes 203 are disposed apart from each other. The insertion holes 203 are in communication with the internal space of the manifold 200 and the outside.

A configuration of the manifold 200 will be described in detail later.

Cell Stack 250

Figure 3:
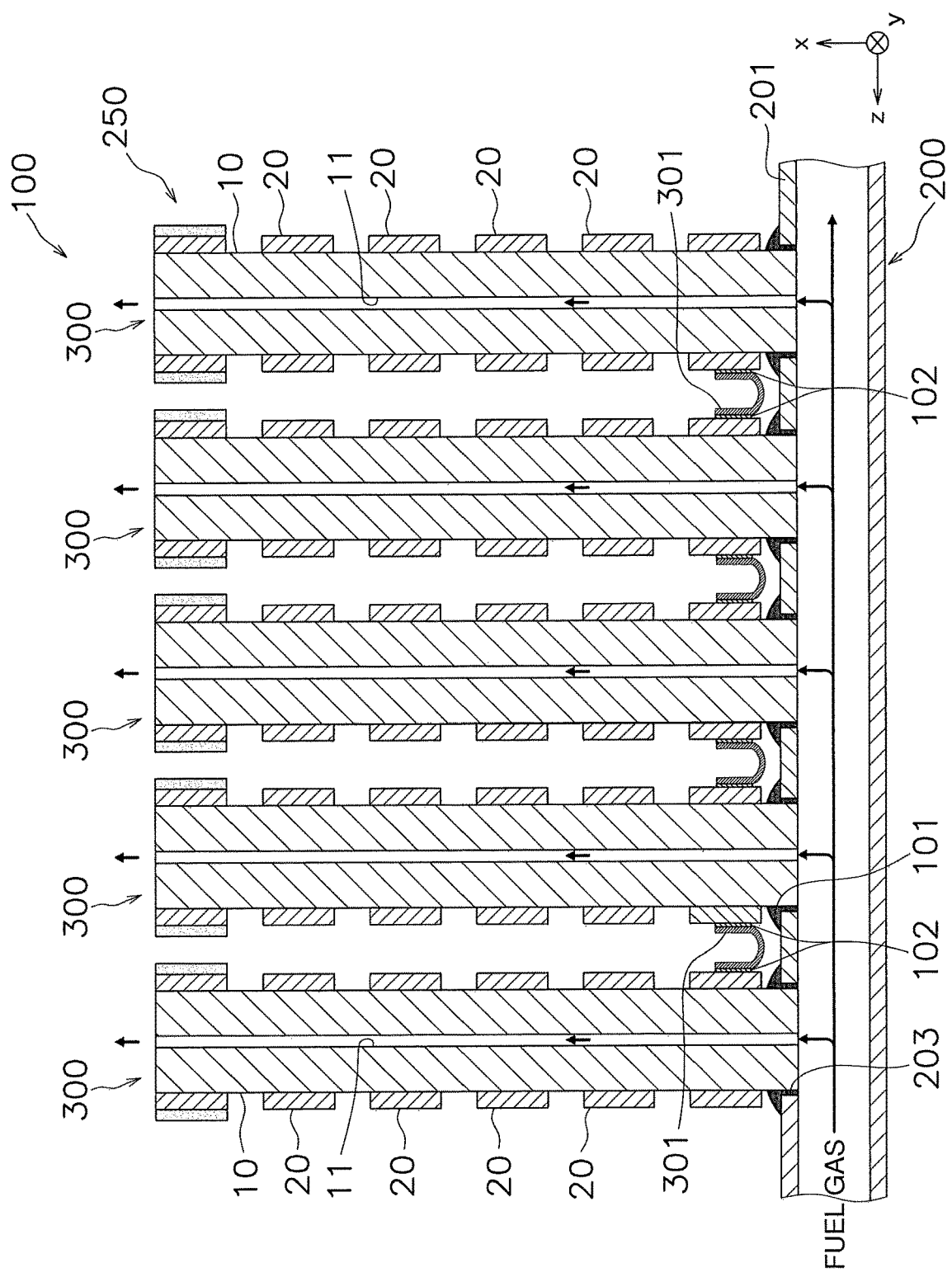
FIG. 3 is a cross-sectional view of the cell stack device.

FIG. 3 is a cross-sectional view of the cell stack device 100. The cell stack 250 includes a plurality of fuel cells 300 and a plurality of current collector members 301.

The fuel cells 300 extend from the manifold 200. Specifically, the fuel cells 300 extend upward (the X-axis direction) from the top plate 201 of the manifold 200. That is, the longitudinal direction (the X-axis direction) of each fuel cell 300 extends upward. Although the length of each fuel cell 300 in the longitudinal direction (the X-axis direction) may be about 100 to 300 mm, the length thereof is not limited thereto.

Base end points of the fuel cells 300 are inserted into the insertion holes 203 of the manifold 200. The fuel cells 300 are fixed to the insertion holes 203 by the bonding material 101. The fuel cells 300 are fixed to the manifold 200 by the bonding material 101 in a state in which the fuel cells 300 are inserted into the insertion holes 203. Gaps between the fuel cells 300 and the insertion holes 203 are filled with the bonding material 101. Examples of the bonding material 101 include crystallized glass, amorphous glass, brazing materials, and ceramic materials.

Each fuel cell 300 is formed into a plate shape extending in the longitudinal direction (the X-axis direction) and the width direction (the Y-axis direction). The fuel cells 300 are arranged at intervals in the direction in which the fuel cells 300 are arranged (the Z-axis direction). Although there is no particular limitation on the intervals between two adjacent fuel cells 300, the intervals therebetween may have a length of about 1 to 5 mm.

Each fuel cell 300 internally has a gas channel 11. Fuel gas (hydrogen etc.) is supplied from the manifold 200 to the gas channels 11, and oxidant gas (air etc.) is supplied to the peripheries of the fuel cells 300 during the operation of the cell stack device 100.

Two adjacent fuel cells 300 are electrically connected to each other by the current collector member 301. The current collector member 301 is bonded to base ends of two adjacent fuel cells 300 via bonding materials 102. The bonding material 102 may be at least one selected from $(Mn, Co)_3O_4$, $(La, Sr) MnO_3$, and $(La, Sr) (Co, Fe)O_3$, for example.

Fuel Cell 300

Figure 4:
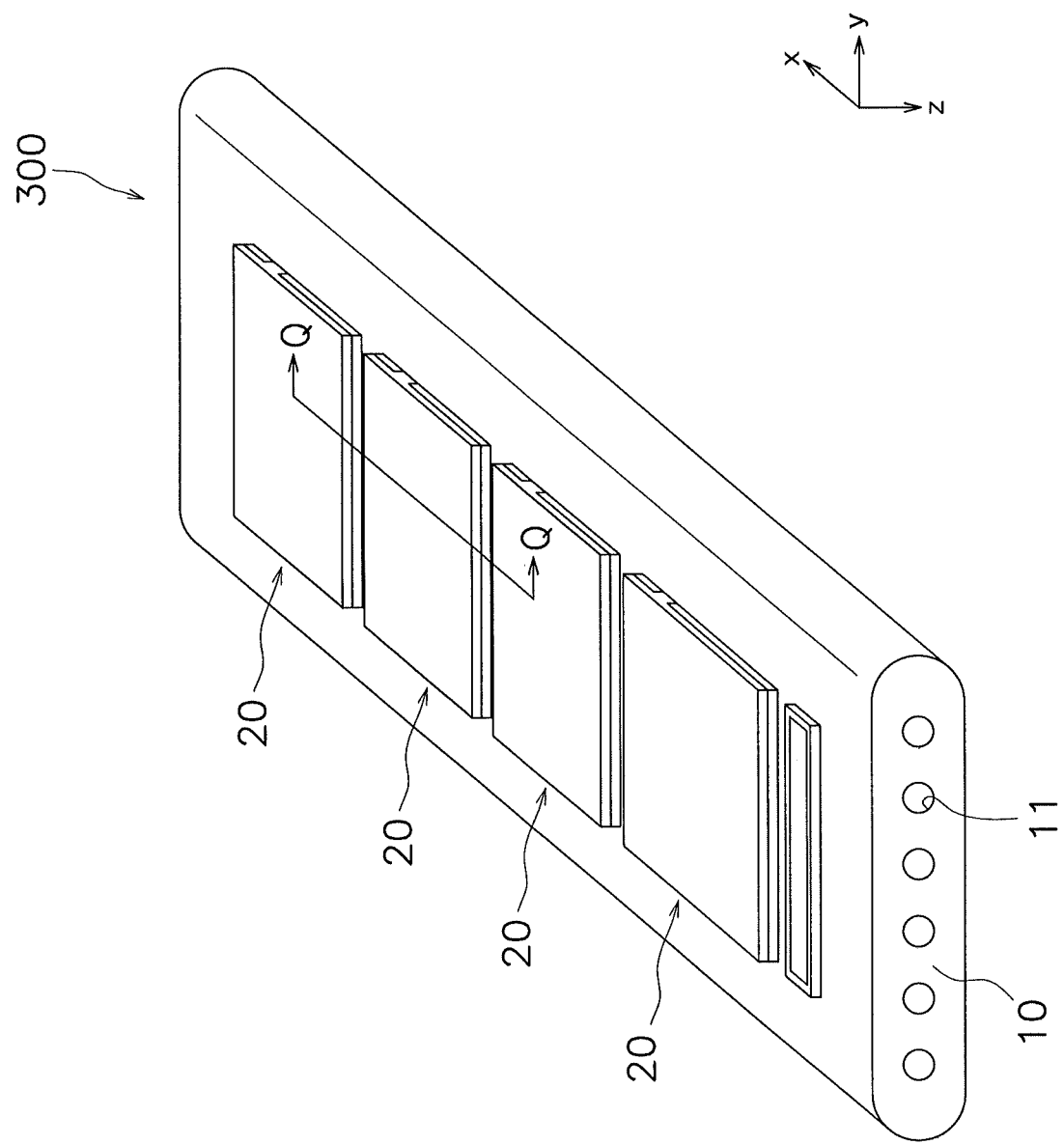
FIG. 4 is a perspective view of a fuel cell.
Figure 5:
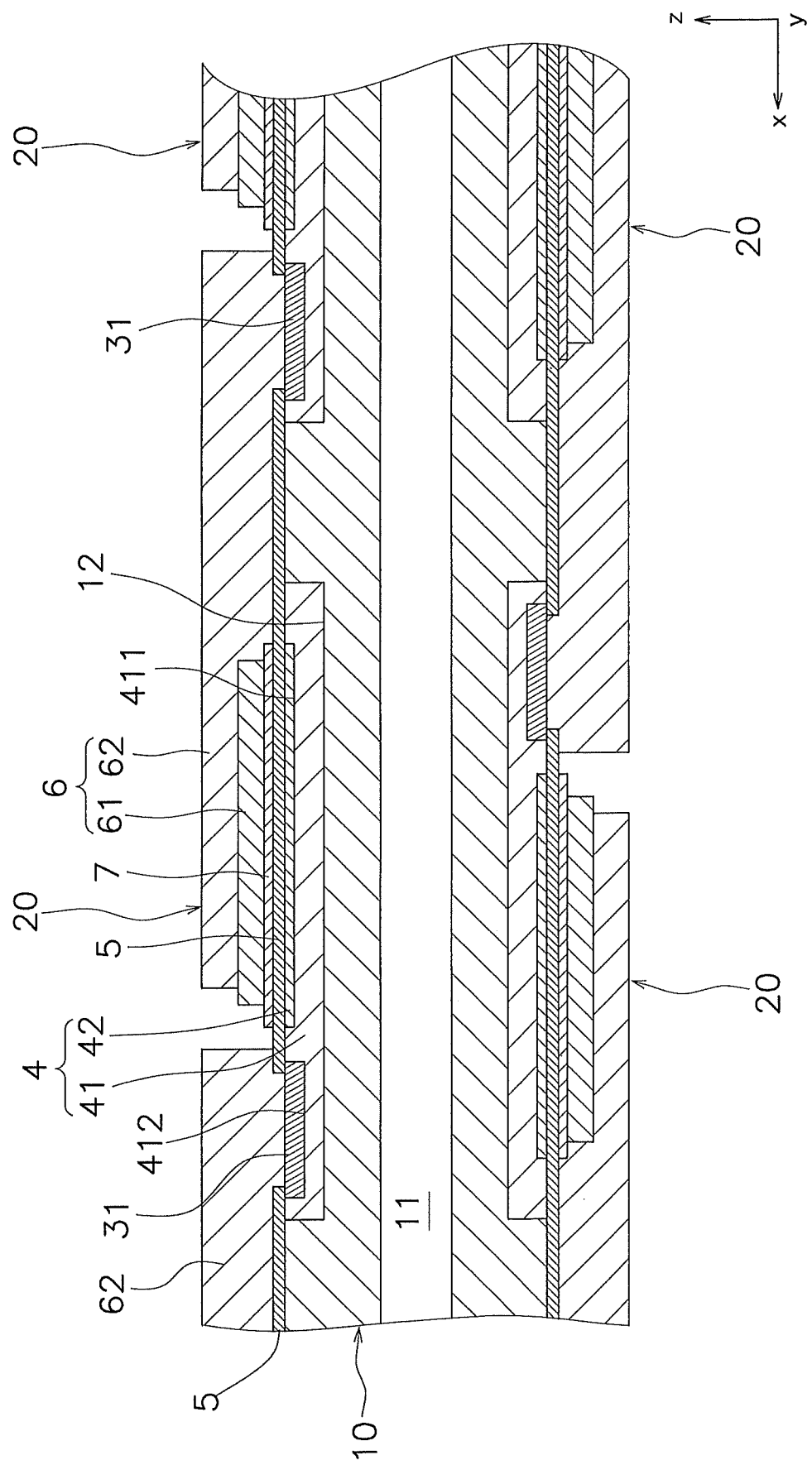
FIG. 5 is a cross-sectional view taken along Q-Q shown in FIG. 4.

FIG. 4 is a perspective view of a fuel cell 300. FIG. 5 is a cross-sectional view thereof taken along Q-Q shown in FIG. 4.

The fuel cell 300 includes a support substrate 10 and a plurality of power generation element portions 20.

Support Substrate 10

The support substrate 10 internally includes a plurality of gas channels 11 extending in the longitudinal direction (the X-axis direction) of the support substrate 10. The gas channels 11 extend from the base end side of the support substrate 10 toward the leading end side. The gas channels 11 extend substantially in parallel to each other.

As shown in FIG. 5, the support substrate 10 has a plurality of first recesses 12. In this embodiment, the first recesses 12 are formed in both main surfaces of the support substrate 10, but may be formed in only one main surface.

The first recesses 12 are disposed apart from each other in the longitudinal direction of the support substrate 10.

The support substrate 10 is constituted by a porous material that does not have electron conductivity. The support substrate 10 may be constituted by CSZ (calcia-stabilized zirconia), for example. Alternatively, the support substrate 10 may be constituted by NiO (nickel oxide) and YSZ (8YSZ) (yttria-stabilized zirconia), NiO (nickel oxide) and $Y_2O_3$ (yttria), or MgO (magnesium oxide) and $MgAl_2O_4$ (magnesia alumina spinel). The support substrate 10 has a porosity of about 20% to 60%, for example.

Power Generation Element Portion 20

The power generation element portions 20 are supported by the support substrate 10. In this embodiment, the power generation element portions 20 are formed on both main surfaces of the support substrate 10, but may be formed on only one main surface. The power generation element portions 20 are disposed apart from each other in the longitudinal direction of the support substrate 10. That is, the fuel cells 300 according to this embodiment are so-called horizontal-stripe type fuel cells. Power generation element portions 20 that are adjacent to each other in the longitudinal direction are electrically connected to each other by an interconnector 31.

The power generation element portions 20 include fuel electrodes 4, electrolytes 5, air electrodes 6, and reaction preventing layers 7.

The fuel electrode 4 is a sintered body constituted by a conductive porous material. The fuel electrode 4 includes a fuel electrode current collector portion 41 and a fuel electrode active portion 42.

The fuel electrode current collector portion 41 is disposed in the first recess 12. Specifically, the first recess 12 is filled with the fuel electrode current collector portion 41, and the fuel electrode current collector portion 41 has the same outer shape as the first recess 12. The fuel electrode current collector portions 41 each have a second recess 411 and a third recess 412. The fuel electrode active portion 42 is disposed in the second recess 411. Also, the interconnector 31 is disposed in the third recess 412.

The fuel electrode current collector portion 41 has electron conductivity. The fuel electrode current collector portion 41 preferably has electron conductivity that is higher than that of the fuel electrode active portion 42. The air electrode current collector portion 41 may have or need not have oxygen ion conductivity.

The fuel electrode current collector portion 41 may be constituted by NiO (nickel oxide) and YSZ (8YSZ) (yttria-stabilized zirconia), for example. Alternatively, the fuel electrode current collector portion 41 may also be constituted by NiO (nickel oxide) and $Y_2O_3$ (yttria), or NiO (nickel oxide) and CSZ (calcia-stabilized zirconia). The fuel electrode current collector portion 41 has a thickness of about 50 to 500 μm and the first recess 12 have a depth of about 50 to 500 μm.

The fuel electrode active portion 42 has oxygen ion conductivity and electron conductivity. The content of a substance having oxygen ion conductivity in the fuel electrode active portion 42 is higher than that in the fuel electrode current collector portion 41. Specifically, the ratio of the volume of the substance having oxygen ion conductivity in the fuel electrode active portion 42 to the total volume of the fuel electrode active portion 42 excluding pore portions is larger than the ratio of the volume of the substance having oxygen electron conductivity in the fuel electrode current collector portion 41 to the total volume of the fuel electrode current collector portion 41 excluding pore portions.

The fuel electrode active portion 42 may be constituted by NIC (nickel oxide) and YSZ (8YSZ) (yttria-stabilized zirconia), for example. Alternatively, the fuel electrode active portion 42 may also be constituted by NiO (nickel oxide) and GDC (gadolinium doped ceria). The fuel electrode active portion 42 has a thickness of 5 to 30 μm.

The electrolyte 5 is disposed covering the fuel electrode 4. Specifically, the electrolyte 5 extends in the longitudinal direction from a given interconnector 31 to an adjacent interconnector 31. That is, the electrolytes 5 and the interconnectors 31 are disposed in an alternating manner in the longitudinal direction (the X-axis direction) of the support substrate 10. The electrolyte 5 is configured to cover both main surfaces of the support substrate 10.

The electrolyte 5 is a sintered body constituted by a compact material having ionic conductivity and no electron conductivity. The electrolyte 5 may be constituted by YSZ (8YSZ) (yttria-stabilized zirconia), for example. Alternatively, the electrolyte 5 may also be constituted by LSGM (lanthanum gallate). The electrolyte 5 has a thickness of about 3 to 50 μm, for example.

The air electrode 6 is a sintered body constituted by a conductive porous material. The air electrode 6 is disposed opposite to the fuel electrode 4 with respect to the electrode 5. The air electrode 6 includes an air electrode active portion 61 and an air electrode current collector portion 62.

The air electrode active portion 61 is disposed on the reaction preventing layer 7. The air electrode active portion 61 has oxygen ion conductivity and electron conductivity. The content of a substance having oxygen ion conductivity in the air electrode active portion 61 is higher than that in the air electrode current collector portion 62. Specifically, the ratio of the volume of the substance having oxygen ion conductivity in the air electrode active portion 61 to the total volume of the air electrode active portion 61 excluding pore portions is larger than the ratio of the volume of the substance having oxygen electron conductivity in the air electrode current collector portion 62 to the total volume of the air electrode current collector portion 62 excluding pore portions.

The air electrode active portion 61 may be constituted by LSCF=(La, Sr) (Co, Fe)$O_3$ (lanthanum strontium cobalt ferrite), for example. Alternatively, the air electrode active portion 61 may also be constituted by LSF=(La, Sr)Fe$O_3$ (lanthanum strontium ferrite), LNF=La(Ni, Fe)$O_3$ (lanthanum nickel ferrite), LSC=(La, Sr) Co$O_3$ (lanthanum strontium cobaltite), or the like. The air electrode active portion 61 may be constituted by two layers of a first layer (inner layer) constituted by LSCF and a second layer (outer layer) constituted by LSC. The air electrode active portion 61 has a thickness of 10 to 100 μm, for example.

The air electrode current collector portion 62 is disposed on the air electrode active portion 61. Also, the air electrode current collector portion 62 extends from the air electrode active portion 61 toward the adjacent power generation element portion. The fuel electrode current collector portion 41 and the air electrode current collector portion 62 extend in opposite directions from a power generation region. The power generation region refers to a region where the fuel electrode active portion 42, the electrolyte 5, and the air electrode active portion 61 overlap each other.

The air electrode current collector portion 62 is a sintered body constituted by a conductive porous material. The air electrode current collector portion 62 preferably has electron conductivity that is higher than that of the air electrode active portion 61. The air electrode current collector portion 62 may have or need not have oxygen ion conductivity.

The air electrode current collector portion 62 may be constituted by LSCF=(La, Sr) (Co, Fe)$O_3$ (lanthanum strontium cobalt ferrite), for example. Alternatively, the air electrode current collector portion 62 may also be constituted by LSC=(La, Sr)Co$O_3$ (lanthanum strontium cobaltite). Alternatively, the air electrode current collector portion 62 may also be constituted by Ag (silver) or Ag—Pd (a silver palladium alloy). The air electrode current collector portion 62 has a thickness of about 50 to 500 μm, for example.

The reaction preventing layer 7 is a sintered body constituted by a compact material. The reaction preventing layer 7 is disposed between the electrolyte 5 and the air electrode active portion 61. The reaction preventing layer 7 is provided in order to suppress the occurrence of a phenomenon in which a reaction layer with large electric resistance is formed at an interface between the electrolyte 5 and the air electrode 6 through a reaction between YSZ in the electrolyte 5 and Sr in the air electrode 6.

The reaction preventing layer 7 is constituted by a material containing ceria containing a rare earth element. The reaction preventing layer 7 may be constituted by GDC=(Ce, Gd)$O_2$ (gadolinium doped ceria), for example. The reaction preventing layer 7 has a thickness of about 3 to 50 μm, for example.

The interconnector 31 is configured to electrically connect power generation element portions 20 that are adjacent to each other in the longitudinal direction (the X-axis direction) of the support substrate 10. Specifically, the air electrode current collector portion 62 of one power generation element portion 20 extends toward another power generation element portion 20. Also, the fuel electrode current collector portion 41 of the other power generation element portion 20 extends toward the one power generation element portion 20. Also, the interconnector 31 electrically connects the air electrode current collector portion 62 of the one power generation element portion 20 and the fuel electrode current collector portion 41 of the other power generation element portion 20. The interconnector 31 is disposed in the third recess 412 of the fuel electrode current collector portion 41. Specifically, the interconnector 31 is embedded in the third recess 412.

The interconnector 31 is a sintered body constituted by a conductive compact material. The interconnector 31 may be constituted by LaCr$O_3$ (lanthanum chromite), for example. Alternatively, the interconnector 31 may also be constituted by (Sr, La)Ti$O_3$ (strontium titanate). The interconnector 31 has a thickness of 10 to 100 μm, for example.

Detailed Configuration of Manifold 200

Figure 7:
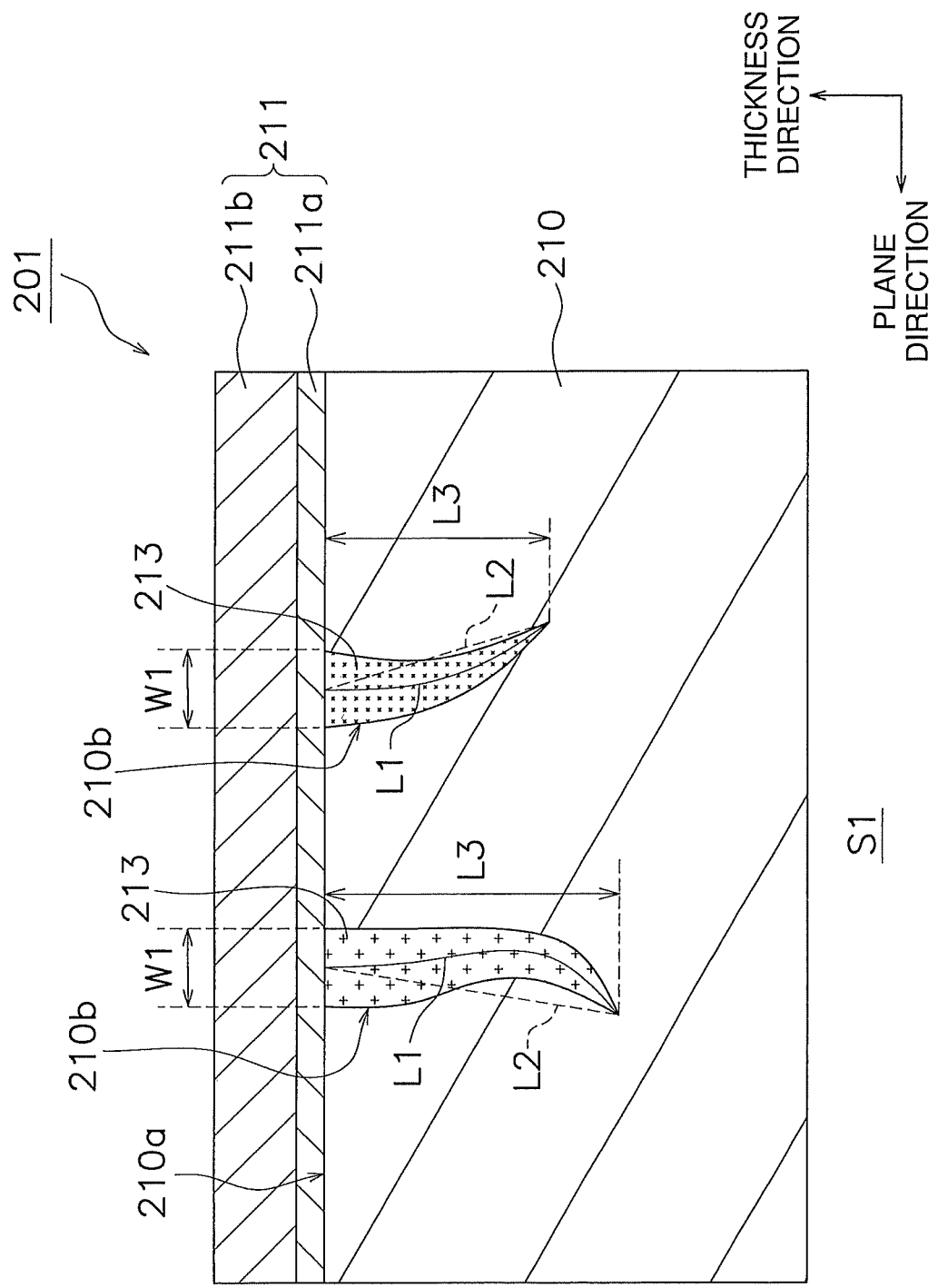
FIG. 7 is an enlarged view of a region A shown in FIG. 6.

Next, a detailed configuration of the manifold 200 will be described with reference to the drawings. FIG. 6 is a cross-sectional view taken along P-P shown in FIG. 2. FIG. 7 is an enlarged view of a region A shown in FIG. 6.

The top plate 201 is bonded to the container 202 by the bonding material 103. An internal space S1 into which fuel gas is supplied is formed between the top plate 201 and the container 202.

The top plate 201 includes a base member 210, a coating layer 211, and embedded portions 213. The container 202 includes a base member 220, a coating layer 221, and embedded portions 223. The coating layer 211 includes a chromium oxide layer 211*a* and a covering layer 211*b*. The coating layer 221 includes a chromium oxide layer 221*a* and a covering layer 221*b*.

The top plate 201 and the container 202 are examples of the "alloy member". The base member 210 and the base member 220 are examples of the "base member". The coating layer 211 and the coating layer 221 are examples of the "coating layer". The embedded portions 213 and the embedded portion 223 are examples of the "embedded portion".

Because the configuration of the container 202 is the same as the configuration of the top plate 201, the configuration of the top plate 201 will be described below with reference to FIG. 7.

The base member 210 is formed into a plate shape. The base member 210 may have a flat plate shape or a curved plate shape. Although there is no particular limitation on the thickness of the base member 210, the thickness thereof may be 0.5 to 4.0 mm, for example.

The base member 210 is constituted by an alloy material containing Cr (chromium). An Fe—Cr-based alloy steel (stainless steel etc.), a Ni—Cr-based alloy steel, or the like may be used as such a metal material. Although there is no particular limitation on the Cr content in the base member 210, the Cr content may be 4 to 30 mass %.

The base member 210 may contain Ti (titanium) and Al (aluminum). Although there is no particular limitation on the Ti content in the base member 210, the Ti content may be 0.01 to 1.0 at. %. Although there is no particular limitation on the Al content in the base member 210, the Al content may be 0.01 to 0.4 at. %. The base member 210 may contain Ti as $TiO_2$ (titania), and Al as $Al_2O_3$ (alumina).

The base member 210 has a surface 210a and a plurality of recesses 210b. The surface 210a is an outer surface of the base member 210. The base member 210 is bonded to the coating layer 211 on the surface 210a. Although the surface 210a is formed into a substantially planar shape in FIG. 7, the surface 210a may be provided with minute recesses and protrusions, or may be curved or bent entirely or partially.

The recesses 210b are formed in the surface 210a. The recesses 210b extend from the surface 210a toward an inner portion of the base member 210. Embedded portions 213, which will be described later, are embedded in the recesses 210b.

Although there is no particular limitation on the number of recesses 210b, the recesses 210b are preferably widely distributed in the surface 210a. Also, although there is no particular limitation on the intervals between recesses 210b, it is particularly preferable that the recesses 210b are disposed at equal intervals. Accordingly, the anchor effect resulting from the embedded portions 213 can be evenly exerted on the entire coating layer 211, thus particularly inhibiting separation of the coating layer 211 from the base member 210.

The cross-sectional shape of at least one of the plurality of recesses 210b is curved or bent entirely or partially. The cross-sectional shape of such a recess 210b is not a linear shape, but a shape in which at least a portion thereof is warped. The deepest portion of the recess 210b may have an acute angle, an obtuse angle, or a round shape. FIG. 7 shows, as an example, a wedge-shaped recess 210b that is entirely curved (the right side in FIG. 7), and a wedge-shaped recess 210b having a curved lower half (the left side in FIG. 7). Note that the cross-sectional shape of at least one of the plurality of recesses 210b may be entirely linear.

The coating layer 211 covers at least a portion of the base member 210, and is connected to the embedded portions 213. The coating layer 211 includes a chromium oxide layer 211a and a covering layer 211b in this embodiment.

The chromium oxide layer 211a is formed on the surface 210a of the base member 210. The chromium oxide layer 211a covers at least a portion of the surface 210a of the base member 210. The chromium oxide layer 211a is connected to the embedded portions 213. The chromium oxide layer 211a is formed covering the embedded portions 213. The chromium oxide layer 211a is connected to the embedded portions 213. Although there is no particular limitation on the thickness of the chromium oxide layer 211a, the thickness thereof may be 0.5 to 10 μm.

The covering layer 211b covers at least a portion of the chromium oxide layer 211a. Specifically, the covering layer 211b covers at least a portion of a region of the chromium oxide layer 211a that is to come into contact with oxidant gas during the operation of the cell stack device 100. The covering layer 211b preferably covers the entire surface of the region of the chromium oxide layer 211a that is to come into contact with oxidant gas. Although there is no particular limitation on the thickness of the covering layer 211b, the thickness thereof may be 3 to 200 μm, for example.

The covering layer 211b inhibits Cr from volatilizing from the base member 210 to the outside. This makes it possible to inhibit electrodes (the air electrodes 6 in this embodiment) of the fuel cells 300 from deteriorating through Cr poisoning.

The covering layer 211b is constituted by a ceramic material. A suitable ceramic material for constituting the covering layer 211b is selected according to a portion to which the covering layer 211b is applied. If the alloy member according to the present invention is applied to the manifold 200 as in this embodiment, the covering layer 211b needs to have insulating properties, and thus examples of the ceramic material include alumina, silica, zirconia, and crystallized glass. On the other hand, if the alloy member according to the present invention is applied to the current collector member 301, the covering layer 211b needs to be conductive, and thus examples of the ceramic material include perovskite complex oxides containing La and Sr and spinel complex oxides constituted by transition metals such as Mn, Co, Ni, Fe, and Cu. However, the covering layer 211b needs only to inhibit volatilization of Cr, and the material constituting the covering layer 211b is not limited to the above-described ceramic material.

The embedded portions 213 are disposed in the recesses 210b of the base member 210. The embedded portions 213 are connected to the chromium oxide layer 211a near opening portions of the recesses 210b. Because the chromium oxide layer 211a is inserted between the embedded portions 213 and the covering layer 211b in this embodiment, the embedded portions 213 are connected to the chromium oxide layer 211a. However, if the chromium oxide layer 211a is not inserted between the embedded portions 213 and the covering layer 211b, the embedded portions 213 are connected to the covering layer 211b.

In a cross-section of the base member 210 along the thickness direction, an average actual length of the plurality of embedded portions 213 is longer than an average straight line length of the plurality of embedded portions 213. This means that at least one of the embedded portions 213 is warped due to at least one of the embedded portions 213 being curved or bent entirely or partially. Thus, the anchor effect of the embedded portions 213 on the base member 210 can be increased, thus inhibiting separation of the coating layer 211 from the base member 210.

The average actual length of the plurality of embedded portions 213 refers to the average value of actual lengths L1 of the embedded portions 213. As shown in FIG. 7, the actual length L1 refers to the length of a line segment obtained by connecting midpoints in a surface direction of a part of the embedded portion 213 that is embedded in a recess 210b. The surface direction is perpendicular to the thickness direction. The actual length L1 indicates the total length of the embedded portion 213 in the direction in which the embedded portion 213 extends.

The average actual length of the embedded portions 213 can be obtained by arithmetically averaging the actual lengths L1 of twenty embedded portions 213 that are selected at random from an image obtained by enlarging a cross-section of the base member 210 at a magnification of 1,000 to 20,000 times using a FE-SEM (Field Emission-Scanning Electron Microscope). Note that, if twenty embedded portions 213 cannot be observed in one cross-section, twenty embedded portions 213 need only to be selected from a plurality of cross-sections. However, an embedded portion 213 having an actual length L1 of less than 0.1 μm is excluded when the average actual length of the embedded portions 213 is calculated because such an embedded portion 213 has a slight anchor effect, and makes little contribution to the effect of inhibiting separation of the coating layer 211.

The average straight line length of the plurality of embedded portions 213 refers to the average value of straight line lengths L2 of the embedded portions 213. As shown in FIG. 7, the straight line length L2 refers to the length of a straight line connecting the start point and the end point of a line segment that defines the actual length L1. The straight line length L2 indicates the shortest distance between both ends of the embedded portion 213.

The average straight line length of the plurality of embedded portions 213 can be obtained by arithmetically averaging the straight line lengths L2 of the twenty embedded portions 213 selected in order to obtain the above-described average actual length.

Note that, although the actual length L1 is substantially the same as the straight line length L2 if the embedded portion 213 is entirely linearly formed, the actual length L1 is longer than the straight line length L2 if at least a portion thereof is warped as the embedded portion 213 according to this embodiment. As shown in FIG. 7, the embedded portions 213 may have different actual lengths L1 and different straight line lengths L2, or may have the same actual length L1 and the same straight line length L2.

Although there is no particular limitation on the ratio of the average actual length to the average straight line length (the average actual length/the average straight line length), the ratio thereof is preferably 1.10 or more. Accordingly, the anchor effect of the embedded portions 213 on the base member 210 can be sufficiently increased, thus further inhibiting separation of the coating layer 211 from the base member 210. The ratio of the average actual length of the embedded portions 213 to the average straight line length thereof (the average actual length/the average straight line length) is preferably 1.2 or more, and particularly preferably 1.3 or more.

Although there is no particular limitation on the average actual length, the average actual length may be 0.5 μm to 600 μm inclusive, for example. Although there is no particular limitation on the average straight line length, the average straight line length may be 0.4 μm to 550 μm inclusive, for example.

Although there is no particular limitation on the average vertical length of the embedded portions 213 in a cross-section of the base member 210 along the thickness direction, the average vertical length thereof may be 0.4 μm to 500 μm inclusive, for example. The average vertical length refers to the average value of vertical lengths L3 of the embedded portions 213. As shown in FIG. 7, the vertical length L3 refers to the total length of a part of the embedded portion 213 that is embedded in the recess 210b in the thickness direction that is perpendicular to the surface 210a of the base member 210. As shown in FIG. 7, the embedded portions 213 may have different vertical lengths L3, or may have the same vertical length L3.

Also, it is preferable that the average bonding width of the plurality of embedded portions 213 and the chromium oxide layer 211a is 0.1 μm or more in a cross-section of the base member 210 along the thickness direction. Accordingly, the bonding strength between the embedded portions 213 and the coating layer 211 is increased, thus inhibiting the embedded portions 213 from breaking away from the coating layer 211. As a result, it is possible to further inhibit separation of the coating layer 211 from the base member 210.

The average bonding width of the plurality of embedded portions 213 refers to the average value of bonding widths W1 of the embedded portions 213. The bonding width W1 refers to the total length of a tangent line between the embedded portion 213 and the coating layer 211 in a cross-section of the base member 210 along the thickness direction. The tangent line between the embedded portion 213 and the coating layer 211 may be a straight line, a curved line, a wavy line, or the like.

The average bonding width of the plurality of embedded portions 213 can be obtained by arithmetically averaging bonding widths W1 of the twenty embedded portions 213 selected in order to obtain the above-described average vertical length.

Note that there is no particular limitation on the upper limit of the bonding width W1, and the upper limit thereof may be 100 μm or less, for example.

Although there is no particular limitation on the ratio of the average bonding width to the average actual length (the average bonding width/the average actual length), the ratio thereof is preferably 0.5 or less. Accordingly, the embedded portions 213 can protrude sharply, thus further increasing the anchoring force of the embedded portions 213 to the base member 210.

The embedded portions 213 are constituted by a ceramic material. Although examples of the ceramic material constituting the embedded portions 213 include $Cr_2O_3$ (chromium oxide), $Al_2O_3$ (alumina)/$TiO_2$ (titania), CaO (calcium oxide), $SiO_2$ (silica), MnO (manganese oxide), and $MnCr_2O_4$ (manganese chromium spinel), the examples thereof are not limited thereto.

Oxides of an element whose equilibrium oxygen pressure is lower than that of Cr (chromium) (referred to as a "low-equilibrium oxygen pressure element" hereinafter) are suitable as the ceramic material constituting the embedded portions 213. Because the low-equilibrium oxygen pressure element is an element that has a greater affinity for oxygen than Cr and is more likely to be oxidized, it is possible to inhibit oxidation of the base member 210 that surrounds the embedded portions 213 as a result of the embedded portions 213 preferentially taking oxygen that permeates the coating layer 211 during the operation of the cell stack device 100. This makes it possible to maintain the forms of the embedded portions 213, and thus to obtain the anchor effect resulting from the embedded portions 213 for a long period of time. As a result, it is possible to inhibit separation of the coating layer 211 from the base member 210 for a long period of time.

Although examples of the low-equilibrium oxygen pressure element include Al (aluminum), Ti (titanium), Ca (calcium), Si (silicon), and Mn (manganese) and examples of oxides thereof include $Al_2O_3$, $TiO_2$, CaO, $SiO_2$, MnO, and $MnCr_2O_4$, examples thereof are not limited thereto.

The embedded portion 213 may contain only one type of oxide of a low-equilibrium oxygen pressure element, or may contain two or more types thereof. The embedded portion 213 may be constituted by $Al_2O_3$, a mixture of $Al_2O_3$ and $TiO_2$, or a mixture of $TiO_2$, MnO, and $MnCr_2O_4$, for example.

It is preferable that the average content of the low-equilibrium oxygen pressure elements in the plurality of embedded portions 213 is 0.05 or more in terms of a cation ratio when a molar ratio of the elements to the sum of all constituent elements excluding oxygen is defined as the cation ratio. This makes it possible to further inhibit oxidation of the base member 210 that surrounds the embedded portions 213, and thus to obtain the anchor effect resulting from the embedded portions 213 for a long period of time.

There is no particular limitation on the upper limit of the average content of the low-equilibrium oxygen pressure elements in the plurality of embedded portions 213, and a larger upper limit is more preferable.

The average content of the low-equilibrium oxygen pressure elements in the plurality of embedded portions 213 can be obtained using the following method. First, with each of the twenty embedded portions 213 selected in order to obtain the above-described average vertical length, the contents of low-equilibrium oxygen pressure elements are measured in terms of the cation ratios at ten points at which the actual length L1 is divided into eleven portions. Then, with regard to each embedded portion 213, the maximum value is selected from the contents measured at the ten points. Then, the average content of the low-equilibrium oxygen pressure elements is obtained by arithmetically averaging the twenty maximum values selected for the twenty embedded portions 213.

The embedded portion 213 is preferably in contact with at least a portion of the inner surface of the recess 210b. It is particularly preferable that the recess 210b is entirely filled with the embedded portion 213, and the embedded portion 213 is in contact with substantially the entire inner surface of the recess 210b.

Although there is no particular limitation on the number of embedded portions 213, ten or more embedded portions 213 are preferably observed in a 10 mm length of the surface 210a in the observation of a cross-section of the base member 210, and twenty or more embedded portions 213 are more preferably observed in a 10 mm length thereof. Accordingly, the anchor effect resulting from the embedded portions 213 can be evenly exerted in a wide range, thus particularly inhibiting separation of the coating layer 211 from the base member 210.

Method for Manufacturing Manifold 200

A method for manufacturing the manifold 200 will be described with reference to the drawings. Note that a method for manufacturing the container 202 is the same as a method for manufacturing the top plate 201, and thus the method for manufacturing the top plate 201 will be described below.

Figure 8:
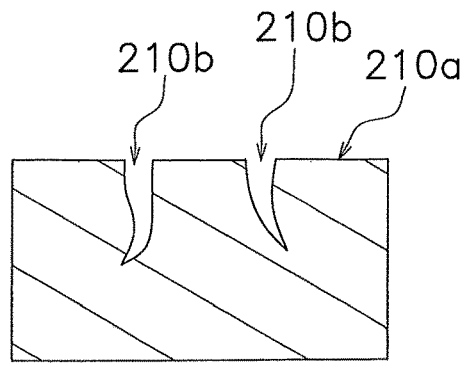
FIG. 8 is a diagram illustrating a method for manufacturing a manifold.

First, as shown in FIG. 8, a plurality of recesses 210b are formed in the surface 210a of the base member 210. It is possible to efficiently form the recesses 210b using shot peening, sandblasting, or wet blasting, for example. At this time, the depth and the width of the recesses 210b are adjusted by adjusting the particle size of a polishing agent. Accordingly, it is possible to adjust the average actual length, the average straight line length, the average vertical length, and the average bonding width of the plurality of embedded portions 213 to be formed later. Also, the recesses 210b are curved or bent entirely or partially by leveling the surface thereof using a roller after the recesses 210b are formed. This makes it possible to warp at least some of the embedded portions 213 to be formed later.

Figure 9:
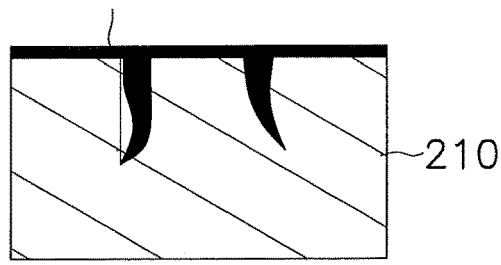
FIG. 9 is a diagram illustrating a method for manufacturing the manifold.

Then, as shown in FIG. 9, by applying, onto the surface 210a of the base member 210, the paste for an embedded portion obtained by adding ethyl cellulose and terpineol to oxides of the low-equilibrium oxygen pressure elements, the recesses 210b are filled with the paste for an embedded portion.

Figure 10:
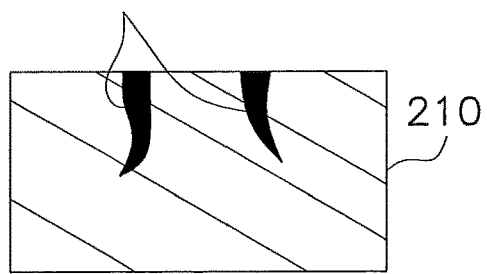
FIG. 10 is a diagram illustrating a method for manufacturing the manifold.

Then, as shown in FIG. 10, the paste for an embedded portion applied onto the surface 210a of the base member 210 is removed using a squeegee, for example.

Figure 11:
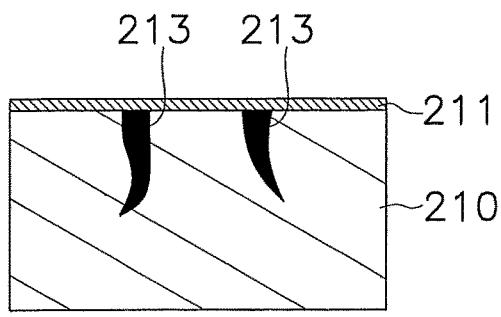
FIG. 11 is a diagram illustrating a method for manufacturing the manifold.

Then, as shown in FIG. 11, as a result of performing heat treatment (800° C. to 900° C., 1 to 20 hours) on the base member 210 in an atmosphere, the paste for an embedded portion with which the recesses 210b are filled is solidified to form the embedded portions 213, and the chromium oxide layer 211a for covering the embedded portions 213 is formed.

Figure 12:
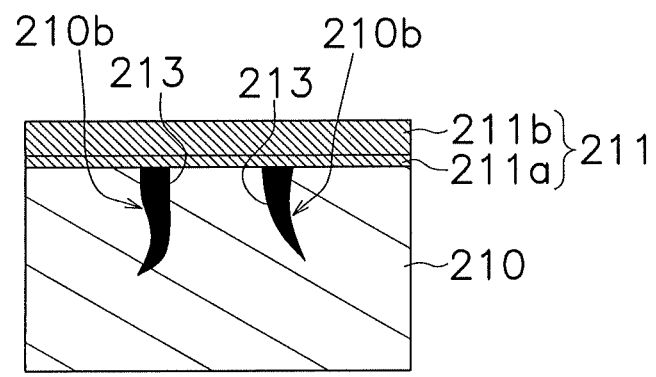
FIG. 12 is a diagram illustrating a method for manufacturing the manifold.

Then, as shown in FIG. 12, the covering layer 211b is formed by applying a paste for a coating layer including a ceramic material for a coating layer onto the chromium oxide layer 211a and performing heat treatment (800° C. to 900° C., 1 to 5 hours).

Other Embodiments

The present invention is not limited to the above-described embodiments, and various changes and modifications can be made without departing from the scope of the present invention.

Variation 1

Although the alloy member according to the present invention is applied to the manifold 200 in the above-described embodiment, the configuration thereof is not limited thereto. The alloy member according to the present invention can be used as a member constituting portions of the cell stack device 100 and the cell stack 250. The alloy member according to the present invention can be applied to the current collector member 301 that is electrically connected to the fuel cell 300, for example.

Variation 2

Although the cell stack 250 includes horizontal-stripe type fuel cells in the above-described embodiment, the cell stack 250 may include vertical-stripe type fuel cells. A vertical-stripe type fuel cell includes a conductive support substrate, a power generation portion (that includes a fuel electrode, a solid electrolyte layer, and an air electrode) disposed on one main surface of the support substrate, and an interconnector disposed on the other main surface of the support substrate.

Variation 3

Although the embedded portions 213 are disposed in the recesses 210b in the above-described embodiment, if the base member 210 includes a plurality of recesses 210b, there may be a recess 210b in which the embedded portion 213 is not disposed.

Variation 4

Although the embedded portions 213 are connected to the coating layer 211 in the above-described embodiment, if a plurality of embedded portions 213 are present, there may be an embedded portion 213 that is not connected to the coating layer 211.

Variation 5

Although the case where the alloy member according to the present invention is applied to a cell stack of fuel cells, which are examples of an electrochemical cell, has been described in the above-described embodiment, the alloy member according to the present invention can be applied to a cell stack of electrochemical cells including an electrolytic cell for generating hydrogen and oxygen from water vapor.

Variation 6

Figure 13:
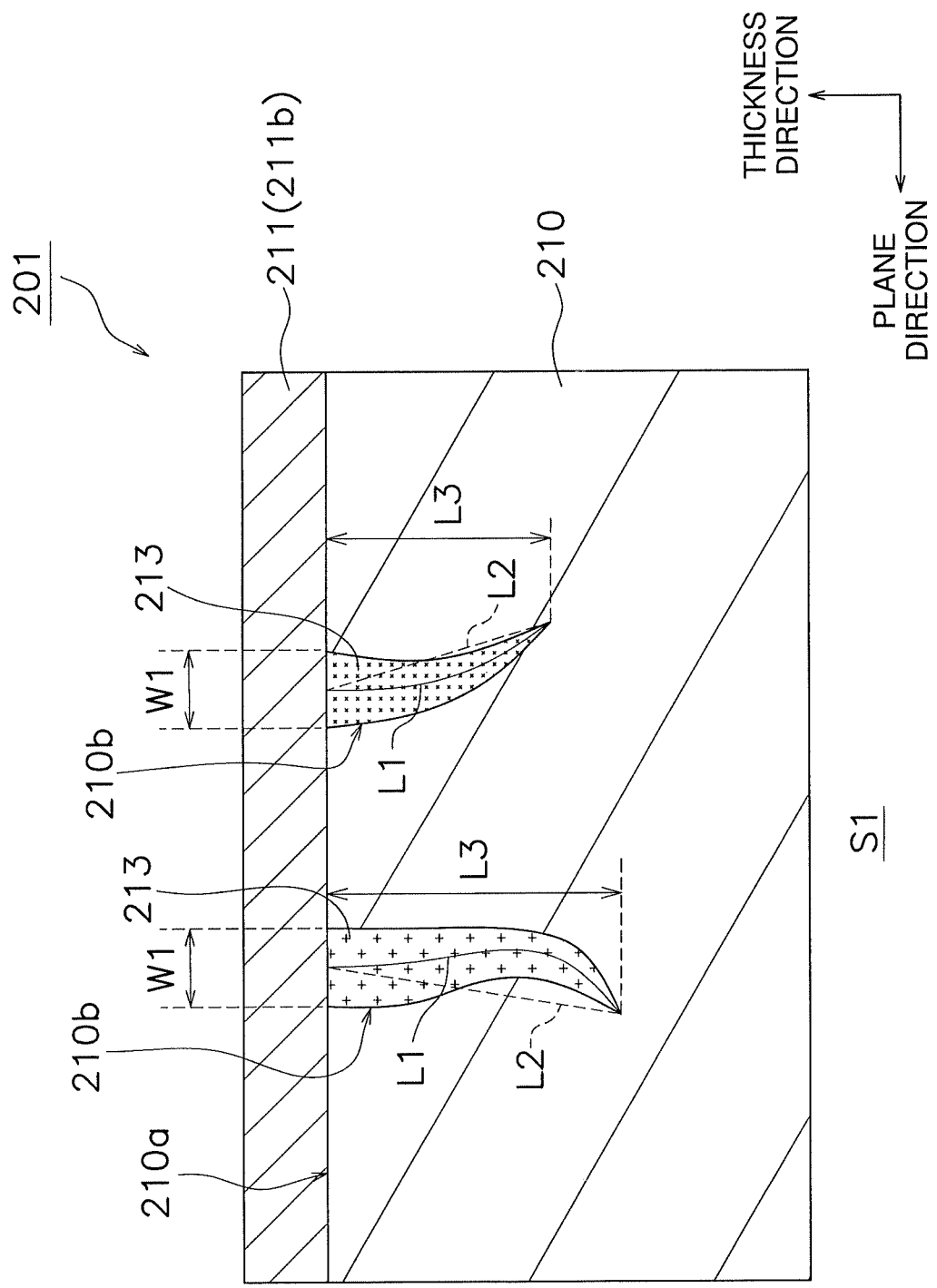
FIG. 13 is a cross-sectional view showing the configuration of a coating layer according to Variation 6.

Although the coating layer 211 includes the chromium oxide layer 211a and the covering layer 211b in this embodiment, the coating layer 211 need only include at least the covering layer 211b. As shown in FIG. 13, the coating layer 211 may substantially include only the covering layer 211b, for example. The actual length L1, the straight line length L2, and the bonding width W1 of each embedded portion 213 are as described in the above-described embodiment. However, because each embedded portion 213 is connected to the covering layer 211b, the bonding width W1 refers to the total length of the tangent line between the embedded portion 213 and the covering layer 211b. Even with the configuration shown in FIG. 13, it is possible to inhibit separation of the covering layer 211b from the base member 210 for a long period of time as a result of making the average actual length of the embedded portions 213 containing oxides of low-equilibrium oxygen pressure elements longer than the average straight line length. The coating layer 211 that only includes the covering layer 211b can be formed by embedding the paste for an embedded portion in the recesses 210b, applying the paste for a covering layer, and performing heat treatment.

Variation 7

Figure 14:
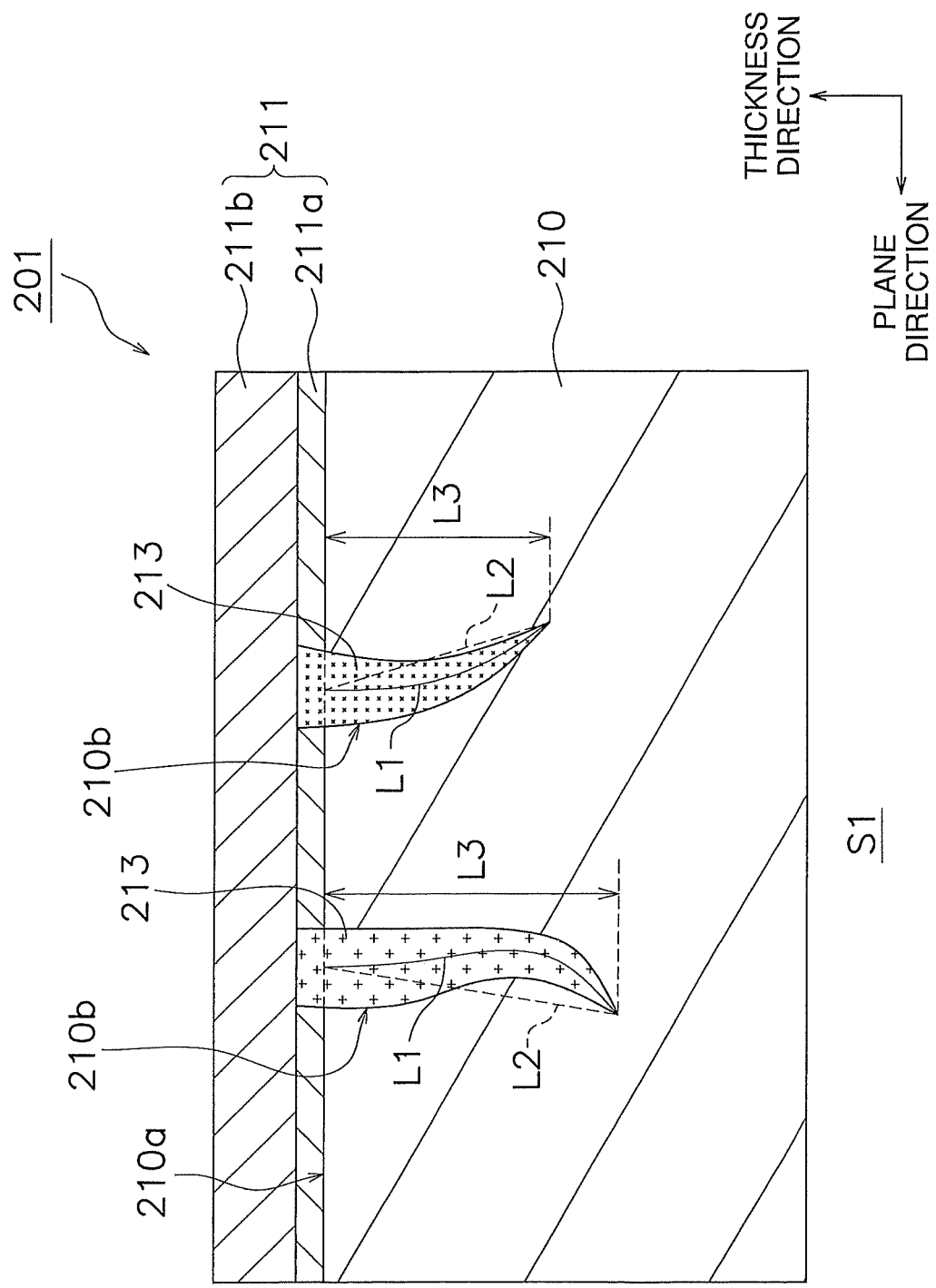
FIG. 14 is a cross-sectional view showing the configuration of a coating layer according to Variation 7.

Although the embedded portions 213 are connected to the chromium oxide layer 211a of the coating layer 211 in the above-described embodiment, as shown in FIG. 14, the embedded portions 213 may be connected to the covering layer 211b of the coating layer 211. In this case, a part of each embedded portion 213 protrudes from the recess 210b of the base member 210, and the remaining part of the embedded portion 213 is embedded in the recess 210b of the base member 210. The part of each embedded portion 213 that is embedded in the recess 210b exhibits the anchor effect on the base member 210. Thus, as shown in FIG. 14, the actual length L1 of each embedded portion 213 refers to the total length of the portion embedded in the recess 210b in the direction in which the portion extends, and the straight line length L2 of the embedded portion 213 refers to the shortest distance between both ends of the portion embedded in the recess 210b. Also, although not shown in FIG. 14, because each embedded portion 213 is connected to both the chromium oxide layer 211a and the covering layer 211b, the bonding width W1 refers to the total length of the tangent line between the embedded portion 213 and the chromium oxide layer 211a, and the tangent line between the embedded portion 213 and the covering layer 211b. Even with the configuration shown in FIG. 14, it is possible to inhibit separation of the covering layer 211b from the base member 210 for a long period of time as a result of making the average actual length of the embedded portions 213 containing oxides of low-equilibrium oxygen pressure elements longer than the average straight line length. In order to connect the embedded portions 213 to the covering layer 211b of the coating layer 211, the covering layer 211b is formed by embedding the paste for an embedded portion in the recesses 210b, applying the paste for a covering layer onto the base member 210, and performing heat treatment, and chromium oxide layer 211a need only be deposited between the base member 210 and the covering layer 211b.

Examples

Although examples of the alloy member according to the present invention will be described hereinafter, the present invention is not limited to the examples described below.

Production of Examples 1 to 19 and Comparative Examples 1 to 4

Alloy members having the configurations shown in FIG. 7 were produced as follows.

First, a plate member made of SUS430 was prepared as a base member.

Then, a plurality of recesses were formed in the surface of the base member by performing sand blasting on the surface of the base member. At this time, the depth and the width of the recesses were adjusted by adjusting the particle size of a polishing agent. The recesses were then curved or bent entirely or partially by leveling the surface thereof using a roller. Accordingly, as shown in Table 1, the average actual length, the average straight line length, and the average bonding width of the plurality of embedded portions to be formed later were adjusted for Examples 1 to 19 and Comparative Examples 1 to 4.

Then, a paste for an embedded portion was prepared by adding ethyl cellulose and terpineol to ceramic material powders shown in Table 1.

Then, the recesses were filled with the paste for an embedded portion by applying the prepared paste for an embedded portion onto the surface of the base member, and then the excess paste for an embedded portion remaining on the surface was removed using a squeegee.

Then, a paste for a chromium oxide layer was prepared by adding ethyl cellulose and terpineol to a chromium oxide powder.

Then, as a result of applying the prepared past for a chromium oxide layer onto the base member and performing heat treatment (800° C. to 900° C., 1 to 5 hours) in an atmosphere, the paste for an embedded portion with which the recesses were filled was solidified to form embedded portions, and the chromium oxide layer connected to the embedded portions was formed.

Then, a paste for a covering layer was prepared by adding ethyl cellulose and terpineol to ceramic material powders for a covering layer shown in Table 1.

Then, a covering layer was formed by applying the prepared paste for a covering layer onto the chromium oxide layer and performing heat treatment (850° C., 2 hours).

Production of Examples 20 to 23 and Comparative Examples 5 and 6

Although the coating layer including the chromium oxide layer and the covering layer was formed in Examples 1 to 20 and Comparative Examples 1 to 4 above, as shown in FIG. 13, a coating layer including only a covering layer was formed in Examples 20 to 23 and Comparative Examples 5 and 6.

Specifically, embedded portions were formed through solidification as a result of the recesses of the base member being filled with the paste for an embedded portion, the paste for a covering layer being applied onto the base member, and heat treatment (850° C., 2 hours) being performed, and the coating layer connected to the embedded portions was formed.

Average actual length, average straight line length, and average bonding width of embedded portions With regard to Examples 1 to 23 and Comparative Examples 1 to 6, average actual lengths, average straight line lengths, and average bonding widths of embedded portions were measured.

First, twenty embedded portions were selected at random on an image obtained by enlarging a cross-section of the base member at a magnification of 1,000 to 20,000 times using a FE-SEM, and the actual length L1, the straight line length L2, and the bonding width W1 of each embedded portion were measured. Then, the average actual length was obtained by arithmetically averaging the twenty actual lengths L1, the average straight line length was obtained by arithmetically averaging the twenty straight line lengths L2, and the average bonding width was obtained by arithmetically averaging the twenty bonding widths W1.

Observation of Separation

With regard to Examples 1 to 23 and Comparative Examples 1 to 6, observation of separation was carried out through simulation of an actual usage environment.

First, the produced alloy member was introduced into an electric furnace, and a heating and cooling cycle was repeated 50 times in an atmosphere. The heating and cooling cycle included a heating process of increasing the temperature to 850° C. at a temperature increase rate of 300° C./h and holding the temperature at 850° C. for 30 minutes, and a cooling process of reducing the temperature to 100° C. at a temperature reduce rate of 300° C./h and holding the temperature at 100° C. for 30 minutes.

The occurrence of separation that can be confirmed by the appearance of an alloy member was checked by visually observing the appearance of the alloy members, and the occurrence of microscopic separation was checked by observing the surfaces of the alloy members using an electron microscope. In Table 1, an alloy member in which only microscopic separation was observed was evaluated as C, and an alloy member in which separation occurring on the appearance of the alloy member was observed was evaluated as D. Also, tests, which will be described later, were successively carried out on alloy members with no separation observed.

Then, an alloy member with no separation observed was held for 1000 hours in a furnace heated to 850° C., and then a cooling and heating cycle was repeated 50 times. This cooling and heating cycle included the above-described cooling process and heating process.

The occurrence of microscopic separation was checked by observing a cross-section of the alloy member using an electron microscope. In Table 1, an alloy member in which no microscopic separation was observed was evaluated as A, and an alloy member in which microscopic separation was observed was evaluated as B.

TABLE 1

| | | Embedded Portion | | | | Coating layer | | |
|---|---|---|---|---|---|---|---|---|
| | Material | Avg. actual length (μm) | Avg. straight line length (μm) | Avg. actual length/Avg. straight line length | Avg. bonding width (μm) | Presence or absence of chromium oxide layer | Material powder for covering layer | Evaluation of Separation |
| Ex. 1 | manganese chromium spinel | 10 | 8 | 1.25 | 1.5 | present | spinel oxide | A |
| Ex. 2 | manganese chromium spinel | 580 | 439 | 1.32 | 100.0 | present | perovskite oxide | A |
| Ex. 3 | manganese chromium spinel | 200 | 127 | 1.57 | 45.0 | present | crystallized glass | A |
| Ex. 4 | manganese oxide | 550 | 369 | 1.49 | 3.0 | present | spinel oxide | A |
| Ex. 5 | manganese oxide | 345 | 207 | 1.67 | 45.0 | present | perovskite oxide | A |
| Ex. 6 | alumina | 25 | 16 | 1.56 | 1.6 | present | spinel oxide | A |
| Ex. 7 | alumina | 100 | 90 | 1.11 | 4.5 | present | spinel oxide | A |
| Ex. 8 | alumina | 40 | 25 | 1.60 | 14.0 | present | crystallized glass | A |
| Ex. 9 | titania | 2 | 1 | 2.00 | 0.1 | present | spinel oxide | A |
| Ex. 10 | chromium oxide | 0.5 | 0.4 | 1.25 | 0.2 | present | spinel oxide | B |
| Ex. 11 | chromium oxide | 110 | 55 | 2.00 | 10.0 | present | spinel oxide | B |
| Ex. 12 | chromium oxide | 15 | 11 | 1.36 | 5.0 | present | spinel oxide | B |
| Ex. 13 | chromium oxide | 160 | 100 | 1.60 | 8.0 | present | spinel oxide | B |
| Ex. 14 | chromium oxide | 340 | 218 | 1.56 | 75.0 | present | spinel oxide | B |
| Ex. 15 | chromium oxide | 80 | 58 | 1.38 | 3.5 | present | spinel oxide | B |
| Ex. 16 | chromium oxide | 55 | 45 | 1.22 | 4.5 | present | perovskite oxide | B |
| Ex. 17 | chromium oxide | 235 | 183 | 1.28 | 18.0 | present | perovskite oxide | B |
| Ex. 18 | chromium oxide | 55 | 38 | 1.45 | 0.05 | present | spinel oxide | C |
| Ex. 19 | chromium oxide | 25 | 20 | 1.25 | 0.05 | present | spinel oxide | C |
| Ex. 20 | manganese chromium spinel | 120 | 90 | 1.33 | 10.5 | absent | spinel oxide | A |
| Ex. 21 | manganese chromium spinel | 65 | 59 | 1.10 | 4 | absent | spinel oxide | A |
| Ex. 22 | chromium oxide | 20 | 17 | 1.18 | 1.5 | absent | spinel oxide | B |
| Ex. 23 | chromium oxide | 3 | 2.5 | 1.20 | 0.05 | absent | spinel oxide | C |
| Comp. Ex. 1 | chromium oxide | 15 | 15 | 1.00 | 7.5 | present | spinel oxide | D |
| Comp. Ex. 2 | chromium oxide | 100 | 100 | 1.00 | 13.0 | present | spinel oxide | D |
| Comp. Ex. 3 | manganese oxide | 80 | 80 | 1.00 | 11.0 | present | spinel oxide | D |
| Comp. Ex. 4 | alumina | 10 | 10 | 1.00 | 1.5 | present | spinel oxide | D |
| Comp. Ex. 5 | chromium oxide | 50 | 50 | 1.00 | 10.5 | absent | spinel oxide | D |
| Comp. Ex. 6 | chromium oxide | 25 | 25 | 1.00 | 4 | absent | spinel oxide | D |

As shown in Table 1, with Examples 1 to 23 in which the average actual length of the embedded portions was longer than the average straight line length, separation of the coating layer was inhibited, compared to Comparative Examples 1 to 6 in which the average actual length of the embedded portions was the same as the average straight line length. This is because the adhesive force of the coating layer to the base member was increased as a result of improving the anchor effect by warping at least some of the embedded portions.

Also, with Examples 1 to 17 in which the average bonding width of the embedded portions was 0.1 or more, separation of the coating layer was further inhibited, compared to Examples 18 and 19 in which the average bonding width was less than 0.1. Similarly, with Examples 20 to 22 in which the average bonding width of the embedded portions was 0.1 or more, separation of the coating layer was further inhibited, compared to Example 23 in which the average bonding width was less than 0.1. This is because separation of the embedded portions from the coating layer was inhibited due to bonding strength between the embedded portions and the coating layer being increased by setting the average bonding width to 0.1 or more.

Also, with Examples 1 to 9 in which the embedded portions were constituted by oxides of low-equilibrium oxygen pressure elements whose equilibrium oxygen pressure is lower than that of Cr, separation of the coating layer was further inhibited, compared to Examples 10 to 19 in which the embedded portions were constituted by chromium oxide. Similarly, with Examples 20 and 21 in which the embedded portions were constituted by oxides of low-equilibrium oxygen pressure elements whose equilibrium oxygen pressure is lower than that of Cr, separation of the coating layer was further inhibited, compared to Examples 22 to 23 in which the embedded portions were constituted by chromium oxide. This is because the anchor effect resulting from the embedded portions was obtained for a long period of time as a result of further inhibiting oxidation of the base member that surrounds the embedded portions.

The invention claimed is:

1. An alloy member comprising:
a base member including a plurality of recesses in a surface of the base member and comprising an alloy material containing chromium;
a plurality of embedded portions respectively disposed in the plurality of recesses and comprising a ceramic material; and
a coating layer covering at least a portion of the surface of the base member and being connected to the plurality of embedded portions,
an average value of actual lengths of line segments of the plurality of embedded portions being longer than an average value of straight lengths of straight lines of the plurality of embedded portions in a cross-section of the base member along a thickness direction of the base member, each line segment connecting midpoints in a surface direction of a part of the embedded portion that is embedded in the recess, the surface direction being perpendicular to the thickness direction, each straight line connecting a start point and an end point of the line segment, and
the average value of the actual lengths being between 1.10 and 2.00 times the average value of the straight lengths.

2. The alloy member according to claim 1, wherein a bonding length between the plurality of embedded portions and the coating layer is 0.1 µm or more.

3. A cell stack comprising:
an electrochemical cell; and
the alloy member according to claim 1, wherein the alloy member is a current collector member that is electrically connected to the electrochemical cell.

4. A cell stack device comprising:
an electrochemical cell; and
the alloy member according to claim 1, wherein the alloy member is a manifold for supporting a base end point of the electrochemical cell.

5. The alloy member according to claim 1, wherein the plurality of embedded portions is comprising a material that is different from a material of the coating layer.

6. The alloy member according to claim 1, wherein in the plurality of embedded portions, an average content of an element whose equilibrium oxygen pressure is lower than that of chromium is 0.05 or more, in terms of a cation ratio.

* * * * *